Sept. 7, 1926.  1,599,380
A. W. LEE ET AL
ORCHARD HEATER
Filed April 22, 1926
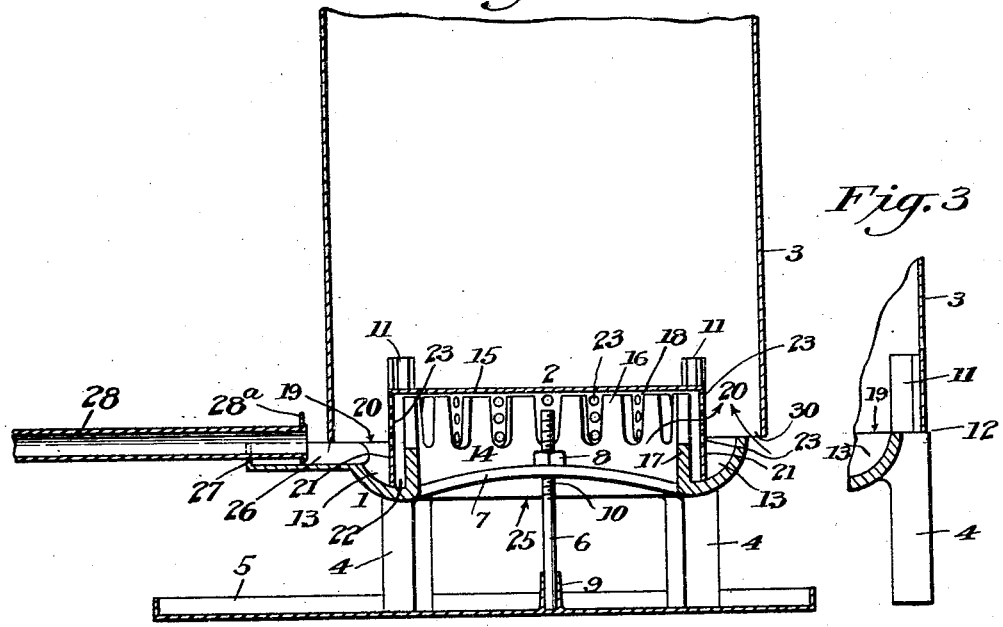
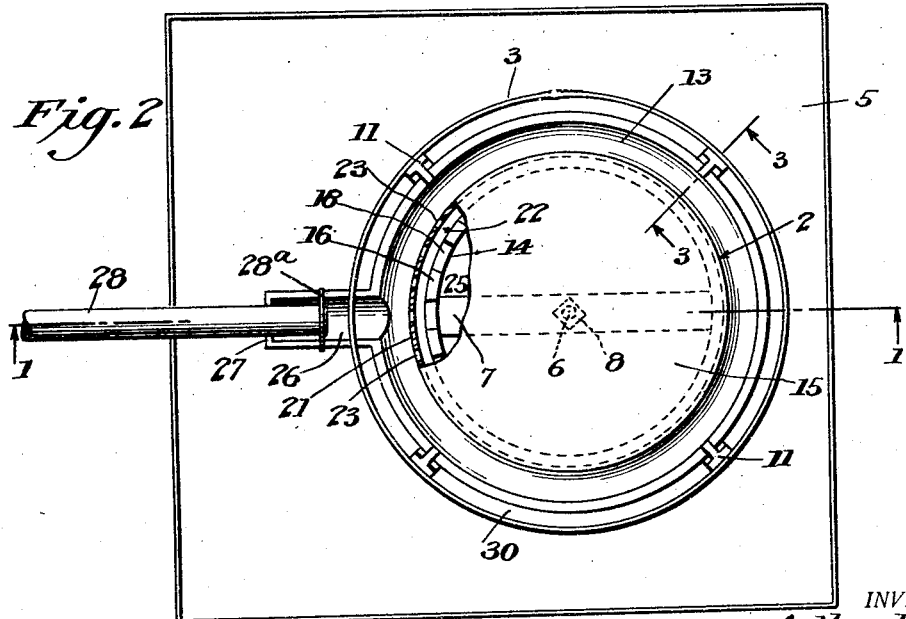
INVENTOR.
Arthur W. Lee,
BY Edgar J. Summerhays,
A.B. Bowman
ATTORNEYS.

Patented Sept. 7, 1926.

1,599,380

UNITED STATES PATENT OFFICE.

ARTHUR W. LEE AND EDGAR J. SUMMERHAYS, OF COVINA, CALIFORNIA.

ORCHARD HEATER.

Application filed April 22, 1926. Serial No. 103,696.

Our invention relates to orchard heaters which are placed among the trees of orchards, such as orange and lemon groves, to heat the surrounding atmosphere to prevent injury to the trees and their fruit from frost and freezing.

The objects in general of the invention are: first, to provide an orchard heater in which the fuel oil and air inlets are so related to each other and to the burner as to provide for a maximum atomization and complete combustion of the oil fuel; second, to provide an orchard heater in which the heat radiating parts are constructed of relatively heavy material so that said parts will radiate a greater amount of heat than otherwise; third, to provide an orchard heater constructed with a fuel sight for conveniently observing at all times the amount of fuel passing to the burner; fourth, to provide a novelly constructed burner for orchard heaters; and, fifth, to provide an orchard heater of this class which is simple and economical of construction, efficient in its action and durable.

With these and other objects in view as will appear hereinafter, our invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a vertical longitudinal section of the heater, through line 1—1 of Fig. 2; Fig. 2 is a plan view of the heater partly broken away to show certain features of construction; and Fig. 3 is a fragmentary, vertical section of the heater taken on line 3—3 of Fig. 2.

Similar characters of reference refer to similar parts and portions throughout the several views of the drawings.

The heater comprises a base frame 1, a burner 2 and a stack 3. The frame 1 is of annular formation and is mounted on legs 4 which may be cast with the frame. The heater may be placed in a pan 5 with the legs 4 resting upon the bottom of the pan and the heater may be secured in the pan by means of a rod 6, a bridge member 7 and a nut 8, the rod 6 being secured to the bottom of the pan at 9 and extending upwardly through the bridge member 7, which extends diametrically of the frame 1 and is secured thereto at its ends, and the nut 8 engaging a thread 10 on the upper portion of rod 6 and binding against the upper side of the bridge member 7. The frame 1 is formed with lugs 11 upstanding from the legs 4, with their outer sides offset slightly inwardly from the outer sides of said legs, forming shoulders 12 upon which rests the lower edge of the stack 3 which fits at its lower end over said lugs.

The burner is of unique construction comprising an annular fuel trough 13 forming the annular portion of the frame 1, a grate 14 formed on the upper inner wall of said trough, and a perforated burner cap 15 fitting over said grate and inner wall with its lower edge resting in the bottom of said trough. The grate 14 is comb-shaped, comprising a plurality of upstanding teeth 16 in the upper portion of the inner vertical wall 17 of the fuel trough 13, the spaces 18 between said teeth forming air inlets. The teeth 16 extend to a point above the outer upper edge 19 of the trough 13 so that the upper portion of the cap, which fits over the grate, extends above the trough and in conjunction with the lower portion 9 of the stack 13, which is of larger diameter than the cap, forms an annular combustion chamber 20 between itself and the stack above the fuel trough 13. The vertical wall 21 of the cap 15 is slightly larger in diameter than the grate 14 and the inner wall of the fuel trough 13, thus providing an air inlet chamber 22 between the cap wall and the grate and trough wall. The upper portion of the vertical cap wall 21 is provided with a plurality of perforations forming air outlets 23 through which air passes from the air chamber 22 into the combustion chamber 20 above the fuel trough 13, the center of the lowermost outlets coinciding with the outer upper edge 19 of the fuel trough and said lowermost outlets lying opposite the lower ends of the grate inlets 18. The inner wall 17 of the fuel oil trough, and the grate 14 form an air intake 25 through which atmospheric air passes upwardly and from which said air passes through the air inlets 18 into the air chamber 22.

The fuel trough 13 is formed at its outer upper edge portion with a shallow trough-shaped fuel inlet 26 of substantially less depth than the burner fuel trough 13, which inlet extends outwardly beyond the frame 3 and its outer end is formed with an upturned narrow flange 27 in which rests the discharge end of a fuel supply pipe 28, and said pipe 28 is also provided with a washer 28ª surrounding the end of the pipe 28. Oil may be observed in the inlet 26 which thus forms a fuel sight feed for showing how the fuel is feeding, to facilitate adjustment of the oil supply and the fire.

The stack 3 being of larger diameter than the fuel trough 13 provides an annular horizontal air inlet 30 between the upper outer edge of the fuel trough and the lower edge of the stack, which edges coincide with each other in horizontal alignment so that air may pass directly from the atmosphere through the inlet in an upward direction into the combustion chamber.

In operation fuel oil is fed from a source of supply through pipe 28 and inlet 26 into the fuel burner trough 13, atmospheric air enters the intake 25 upwardly and passes through inlets 18 into the air chamber 22 and from said chamber through the outlets 23 into the combustion chamber 20 above the fuel trough 13 where said air mixes with other atmospheric air which enters the combustion chamber through inlet 30; said air and the fuel in the trough 13 are then ignited in the combustion chamber by a match, or other means, and heat is generated in the heater, the products of combustion passing out through the stack.

It will be observed that the grate 14 and the fuel trough 13 are of thick construction containing considerable metal which retains and radiates a greater amount of heat than they would otherwise.

Though we have shown and described a particular construction, combination and arrangement of parts and portions, we do not wish to be limited to this particular construction, combination and arrangement but desire to include in the scope of our invention the construction, combination and arrangement substantially as set forth in the appended claims.

Having thus described our invention, what we claim as new and desire to secure by Letters Patent is:

1. An orchard heater, comprising a burner and a stack surrounding and upstanding from said burner and forming a combustion chamber with the burner, said burner comprising a fuel trough located below said combustion chamber, a grate upstanding from the inner side of said trough, and a cap fitting over said grate and resting in said trough, and the vertical wall of the cap being spaced from said grate and provided with perforations.

2. An orchard heater, comprising a burner and a stack surrounding and upstanding from said burner, said burner comprising an annular fuel trough, a grate upstanding from the inner side of said trough, a cap fitting over said grate and resting in said trough, the vertical wall of said cap being of larger diameter than said grate and forming a burner air chamber between itself and the grate, said vertical wall having perforations in the upper portion thereof, the upper portion of the burner cap and the lower portion of the stack forming an annular combustion chamber therebetween above said fuel trough.

3. An orchard heater, comprising a burner and a stack surrounding and upstanding from said burner, said burner comprising an annular fuel trough, a grate upstanding from the inner side of said trough, a cap fitting over said grate and resting in said trough, the vertical wall of said cap being of larger diameter than said grate and forming a burner air chamber between itself and the grate, said vertical wall having perforations in the upper portion thereof, the upper portion of the burner cap and the lower portion of the stack forming an annular combustion chamber therebetween above said fuel trough, the lowermost outlets in said vertical cap wall being centrally aligned with the outer upper edge of said fuel trough.

4. An orchard heater, comprising a burner and a stack surrounding and upstanding from said burner, said burner comprising an annular fuel trough, a grate upstanding from the inner side of said trough, a cap fitting over said grate and resting in said trough, the vertical wall of said cap being of larger diameter than said grate and forming a burner air chamber between itself and the grate, said vertical wall having perforations in the upper portion thereof, the upper portion of the burner cap and the lower portion of the stack forming an annular combustion chamber therebetween above said fuel trough, said stack being of larger diameter than said fuel trough to provide an annular air inlet leading to said combustion chamber between the stack and trough.

5. An orchard heater, comprising a burner and a stack surrounding and upstanding from said burner, said burner comprising an annular fuel trough, a grate upstanding from the inner side of said trough, a cap fitting over said grate and resting in said trough, the vertical wall of said cap being of larger diameter than said grate and forming a burner air chamber between itself and the grate, said vertical wall having perforations in the upper portion thereof, the upper portion of the burner cap and the lower portion of the stack forming an annular combustion chamber therebetween above said fuel trough, said stack being of larger diameter than said fuel trough and the lower edge of said trough being in horizontal alignment with the upper outer edge of said fuel trough to provide an annular air inlet leading to said combustion chamber between said edges.

6. An orchard heater, comprising a burner and a stack surrounding and upstanding from said burner and forming a combustion chamber with the burner, said burner comprising a fuel trough located beneath said combustion chamber, a grate upstanding from the inner side of said trough, and a cap fitting over said grate and resting in said trough, and the vertical wall of the cap being spaced from said grate and provided with perforations, the walls of the fuel trough and the grate being constructed thick to retain a maximum amount of heat and to effect a maximum radiation of heat.

In testimony whereof, we have hereunto set our hands at Los Angeles, California this 14th day of April 1926.

ARTHUR W. LEE.
EDGAR J. SUMMERHAYS.